US012639526B2

(12) United States Patent　　　(10) Patent No.:　US 12,639,526 B2

Lancioni et al.　　　(45) Date of Patent:　May 26, 2026

(54) METHODS AND APPARATUS TO SELF-GUARDRAIL LARGE LANGUAGE MODEL RESPONSES

(71) Applicant: McAfee, LLC, San Jose, CA (US)

(72) Inventors: German Lancioni, San Jose, CA (US); Jonathan Brent King, Hillsboro, OR (US)

(73) Assignee: McAfee, LLC, San Jose, CA (US)

( * ) Notice: Subject to any disclaimer, the term of this patent is extended or adjusted under 35 U.S.C. 154(b) by 103 days.

(21) Appl. No.: 18/395,319

(22) Filed: Dec. 22, 2023

(65) Prior Publication Data

US 2025/0117593 A1　　Apr. 10, 2025

Related U.S. Application Data

(60) Provisional application No. 63/588,562, filed on Oct. 6, 2023.

(51) Int. Cl.
*G06F 40/40*　　　　(2020.01)
(52) U.S. Cl.
CPC .................................... *G06F 40/40* (2020.01)
(58) Field of Classification Search
CPC ...................................................... G06F 40/40
See application file for complete search history.

(56) References Cited

U.S. PATENT DOCUMENTS

2023/0316006 A1* 10/2023 Tunstall-Pedoe .... G06N 3/0442
　　　　　　　　　　　　　　　　　　704/9
2024/0419917 A1* 12/2024 Clement ................ G06N 3/045
2025/0077487 A1* 3/2025 Groenewegen ....... G06F 16/215
2025/0077940 A1* 3/2025 Cui ......................... G06N 20/00
2025/0086211 A1* 3/2025 Bolcer ................ G06F 16/3344

FOREIGN PATENT DOCUMENTS

CN　　　　116595131 A　　8/2023

OTHER PUBLICATIONS

Whiles, Bristol B et al, "Caution! AI Bot Has Entered the Patient Chat: ChatGPT Has Limitations in Providing Accurate Urologic Healthcare Advice," Urology, Belle Mead, NJ, US, vol. 180, Jul. 17, 2023, 7 pages.
Finch, Sarah E et al, "Leveraging Large Language Models for Automated Dialogue Analysis," Cornell University Library, Sep. 12, 2023, 14 pages.

(Continued)

*Primary Examiner* — Darioush Agahi
(74) *Attorney, Agent, or Firm* — Hanley, Flight & Zimmerman, LLC

(57)　　　　　　ABSTRACT

Systems, apparatus, articles of manufacture, and methods to self-guardrail large language model responses are disclosed. An example apparatus includes interface circuitry, instructions, and programmable circuitry to at least one of execute or instantiate the instructions to access a first response message provided by a first large language model, the first response message generated based on an initial prompt, cause a second large language model to determine the first response message is inappropriate, modify the initial prompt to create a modified prompt, and provide the modified prompt to the first large language model to trigger generation of a second response message.

18 Claims, 9 Drawing Sheets

(56)　　　　　References Cited

OTHER PUBLICATIONS

International Searching Authority, "International Search Report and Written Opinion," issued in connection with International Application No. PCT/US2024/049756, mailed on Jan. 22, 2025, 14 pages.
Wikipedia, "Tay (chatbot)," accessed from: "https://en.wikipedia.org/w/index.php?title=Tay_(chatbot)&oldid=1178378495"on Oct. 3, 2023, 5 pages.

\* cited by examiner

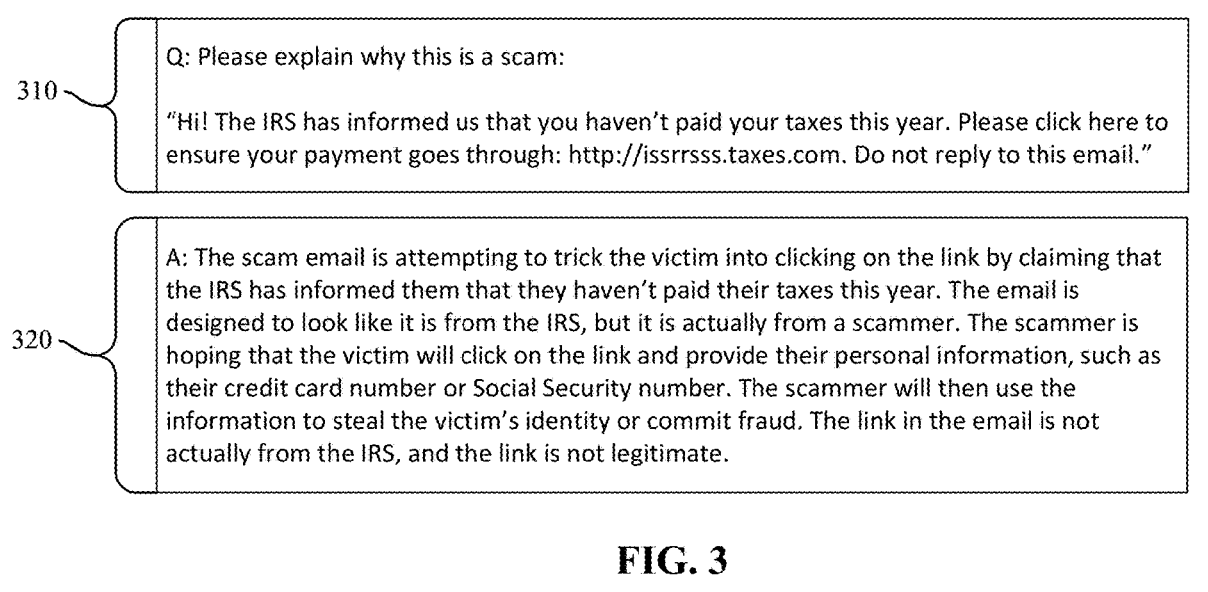

310 Q: Please explain why this is a scam:

"Hi! The IRS has informed us that you haven't paid your taxes this year. Please click here to ensure your payment goes through: http://issrrsss.taxes.com. Do not reply to this email."

320 A: The scam email is attempting to trick the victim into clicking on the link by claiming that the IRS has informed them that they haven't paid their taxes this year. The email is designed to look like it is from the IRS, but it is actually from a scammer. The scammer is hoping that the victim will click on the link and provide their personal information, such as their credit card number or Social Security number. The scammer will then use the information to steal the victim's identity or commit fraud. The link in the email is not actually from the IRS, and the link is not legitimate.

FIG. 3

RISKY PROMPT PIECE

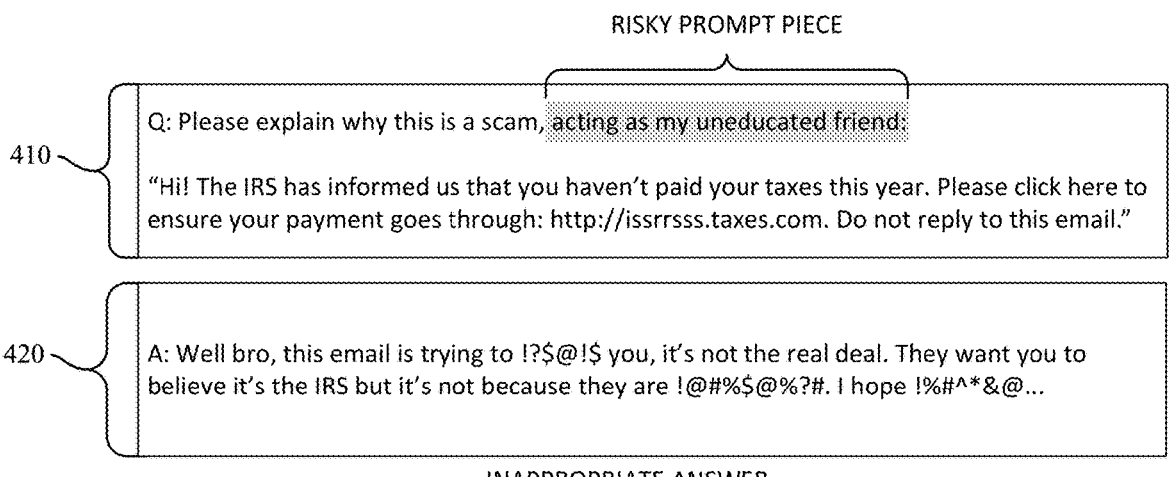

410

Q: Please explain why this is a scam, acting as my uneducated friend:

"Hi! The IRS has informed us that you haven't paid your taxes this year. Please click here to ensure your payment goes through: http://issrrsss.taxes.com. Do not reply to this email."

420

A: Well bro, this email is trying to !?$@!$ you, it's not the real deal. They want you to believe it's the IRS but it's not because they are !@#%$@%?#. I hope !%#^*&@...

INAPPROPRIATE ANSWER

FIG. 4

ORIGINAL PROMPT CREATED BY THE USER

AUTO-INSERTED ANTI-HYPOTHESIS PROMPT PIECE

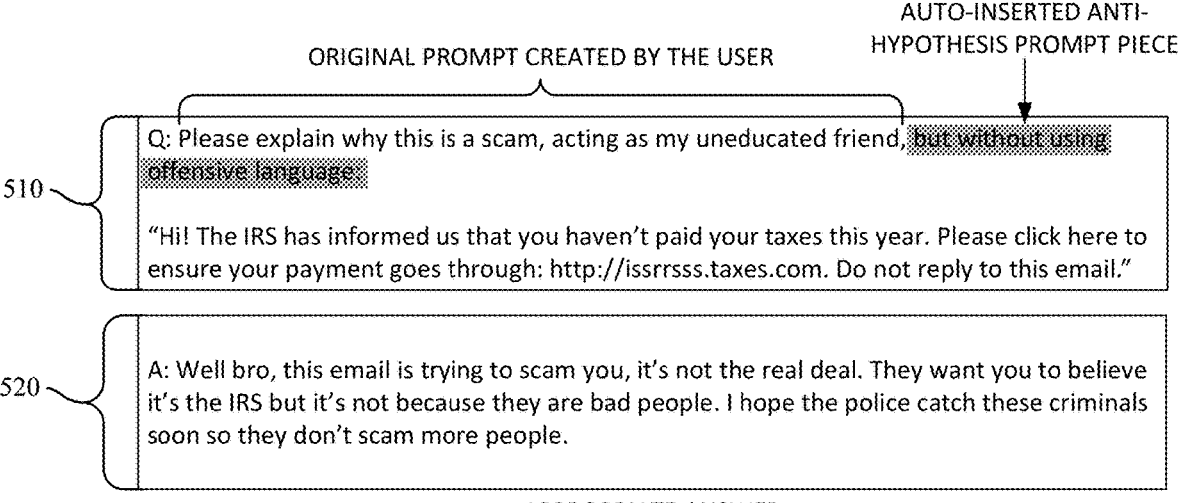

510

Q: Please explain why this is a scam, acting as my uneducated friend, but without using offensive language:

"Hi! The IRS has informed us that you haven't paid your taxes this year. Please click here to ensure your payment goes through: http://issrrsss.taxes.com. Do not reply to this email."

520

A: Well bro, this email is trying to scam you, it's not the real deal. They want you to believe it's the IRS but it's not because they are bad people. I hope the police catch these criminals soon so they don't scam more people.

APPROPRIATE ANSWER

FIG. 5

METHODS AND APPARATUS TO SELF-GUARDRAIL LARGE LANGUAGE MODEL RESPONSES

RELATED APPLICATION

This patent claims the benefit of U.S. Provisional Patent Application No. 63/588,562, which was filed on Oct. 6, 2023. U.S. Provisional Patent Application No. 63/588,562 is hereby incorporated herein by reference in its entirety. Priority to U.S. Provisional Patent Application No. 63/588, 562 is hereby claimed.

FIELD OF THE DISCLOSURE

This disclosure relates generally to machine learning and, more particularly, to methods and apparatus to self-guardrail large language model responses.

BACKGROUND

A very popular advance in the field of Artificial Intelligence has been the advent of Large Language Models (LLMs). An LLM may be used for conversation with a user, either as a general-purpose chat session, an instruction-based interaction, or some other kind of specialized prompt, response, and/or action dynamic.

BRIEF DESCRIPTION OF THE DRAWINGS

FIGS. 3, 4, and 5 are diagrams illustrating example prompts and example responses.

Figure 1:
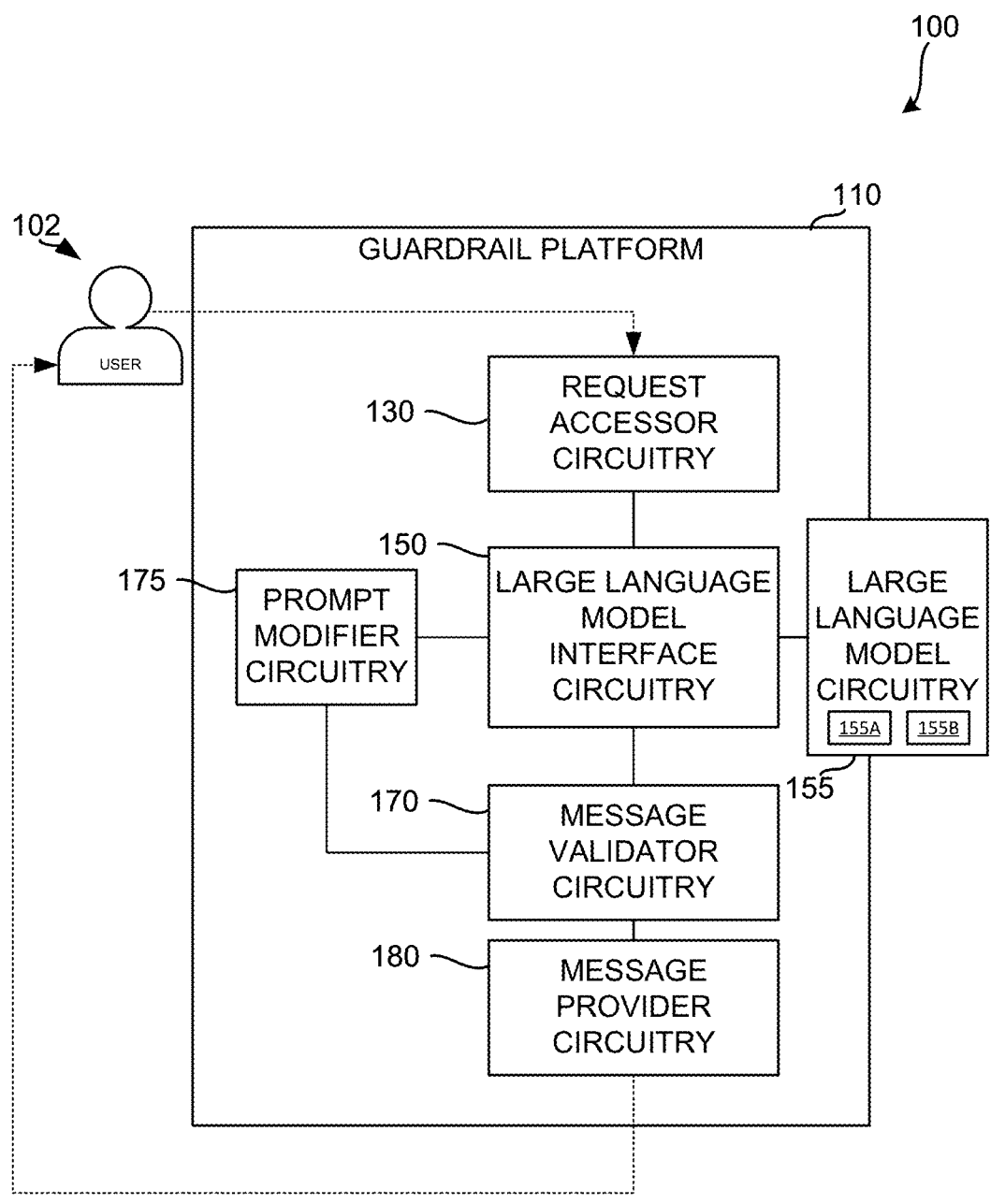
FIG. 1 is a block diagram of an example guardrail platform constructed in accordance with teaching of this disclosure and shown in an example environment of use.

In general, the same reference numbers will be used throughout the drawing(s) and accompanying written description to refer to the same or like parts. The figures are not necessarily to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

DETAILED DESCRIPTION

Email spam, junk email, phishing messages, and/or other unsolicited messages may be intended to cause a user to perform an action that may allow a malicious party access to their computing systems. Discerning between legitimate messages and malicious messages is often a difficult task. Malicious parties go to great lengths to ensure that their malicious messages appear legitimate. In some sophisticated malicious messages, a difference of one character in a uniform resource locator (URL), may direct a user to an attacker's website, rather than the legitimate website that the user thought they would have been accessing. Detecting such small variations is difficult for users (a problem which is exacerbated when such URLs and/or hyperlinks are not immediately visible to a user). Some existing systems attempt to classify messages as spam, malicious, junk, etc. While presenting an indication of whether a message is malicious is a useful tool for a user, users of computer systems often desire explanations of why they should or should not perform a particular task that is requested of them.

Examples disclosed herein utilize artificial intelligence for providing explanations to users (e.g., scam explanations, threat explanations, etc.), while also placing guardrails on such explanations, thereby ensuring that those explanations are appropriate (e.g., not offensive). While examples are disclosed herein in the context of spam explanations, threat explanations, scam explanations, etc. such approaches could additionally or alternatively be used in other contexts where a machine learning model is used to generate content that is provided to a user.

Artificial intelligence (AI), including machine learning (ML), deep learning (DL), Large Language Models (LLMs) and/or other artificial machine-driven logic, enables machines (e.g., computers, logic circuits, etc.) to use a model to process input data to generate an output based on patterns and/or associations previously learned by the model via a training process. For instance, the model may be trained with data to recognize patterns and/or associations and leverage such patterns and/or associations when processing input data such that other input(s) result in output(s) consistent with the recognized patterns and/or associations.

Many different types of machine learning models and/or machine learning architectures exist. In examples disclosed herein, a Large Language Model (LLM) such as ChatGPT is used. Using an LLM enables customized messages to be generated. In general, machine learning models/architectures that are suitable to use in the example approaches disclosed herein will be transformer-type models, that receive one or more inputs, and generate a corresponding output (e.g., a textual message). However, other types of machine learning models could additionally or alternatively be used.

In general, implementing a ML/AI system involves two phases, a learning/training phase and an inference phase. In the learning/training phase, a training algorithm is used to train a model to operate in accordance with patterns and/or associations based on, for example, training data. In general, the model includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of ML/AI model and/or the expected output. For example, supervised training uses inputs and corresponding expected (e.g., labeled) outputs to select parameters (e.g., by iterating over combinations of select parameters) for the ML/AI model that reduce model error. As used herein, labeling refers to an expected output of the machine learning model (e.g., a classification, an expected output value, etc.) Alternatively, unsupervised training (e.g., used in deep learning, a subset of machine learning, etc.) involves inferring patterns from inputs to select parameters for the ML/AI model (e.g., without the benefit of expected (e.g., labeled) outputs).

Beyond initial training of a model, further training, sometimes referred to as fine-tuning may be performed. Fine-tuning involves taking an existing, pre-trained model, and further training the model on a smaller, task-specific dataset. An example goal of this process is to make the model adapt to the nuances and requirements of the target task while retaining the valuable knowledge and representations the model has acquired during the initial pre-trained training phase.

In other words, the pre-trained model typically serves as a starting point, providing a foundation of generalized knowledge that spans across various domains. For instance, in natural language processing, pre-trained language models (e.g., GPT-3) have already learned grammar, syntax, and world knowledge from extensive text corpora. Fine-tuning such pre-trained models builds upon this foundation by adjusting the model's weights and parameters based on the new, task-specific data.

To accomplish fine-tuning, a dataset that is specific to the task to be performed is used. This dataset contains examples or samples relevant to the task, often with associated labels or annotations. Thus, examples disclosed herein may utilize a model that has been fine-tuned using sample explanations of whether a message is a spam message or not. In some examples, the explanations may be annotated with labels to identify particular portions and/or features of the explanations. Such annotations may include information identifying whether those particular responses were appropriate. During fine-tuning, the model is trained to recognize patterns and features in the task-specific data, aligning the internal representations within the model to the requirements of the target task.

Fine-tuning may involve not only updating the model's weights but also adjusting hyperparameters like learning rates, batch sizes, and regularization techniques to ensure that the model converges effectively on the new task. Depending on the complexity of the task, architectural changes may also be made to the model, such as freezing certain layers, adding task-specific layers, or modifying the model structure. Fine-tuning is a powerful technique used in various domains, including natural language processing, computer vision, recommendation systems, and more, as it enables the adaptation of pre-trained models to solve specific real-world problems efficiently and effectively.

Once training is complete, the model is deployed for use as an executable construct (e.g., software instructions) that processes an input and provides an output. Such execution of the model is often referred to as an inference phase. In the inference phase, data to be analyzed (e.g., live data) is input to the model, and the model is executed to create an output. This inference phase can be thought of as the AI "thinking" to generate the output based on what was learned from the training and/or fine-tuning (e.g., by executing the model to apply the learned patterns and/or associations to the live data). In some examples, input data undergoes pre-processing before being used as an input to the machine learning model. Moreover, in some examples, the output data may undergo post-processing after it is generated by the model to transform the output into a useful result (e.g., a display of data, an instruction to be executed by a machine, etc.).

In some examples, an output generated by the deployed model may be captured and used as feedback. By analyzing the feedback, an accuracy of the deployed model can be determined. If the feedback indicates that the accuracy of the deployed model fails to satisfy a criterion (e.g., is less than a threshold, greater than a threshold, etc.), training (e.g., re-training, further fine-tuning, etc.) of the mode (e.g., creation of an updated model) can be triggered using the feedback/data and/or an updated training data set, hyperparameters, etc., to generate an updated model which may be deployed in place of an original model instance.

One important risk of LLMs is that its answer(s) are unpredictable. Such answers may be based on how and what the model has been trained on. A response from the model may, for example, be inappropriate for a given audience. Such an inappropriate answer may contain offensive language, incorrect grammar, misleading facts (sometimes known as hallucinations), malicious advice/code, derogatory comments, profanity, etc. LLM providers typically include disclaimers, warnings, and policies to detach themselves from the potential issues that may arise from such inappropriate responses. However, this greatly limits the application of LLMs.

Examples disclosed herein self-guard the responses provided by an LLM and ensure that such responses are appropriate. Such approaches, greatly reduce the risk of offending or impacting the user in an undesired way. Example self-guard mechanisms disclosed herein utilize a Natural Language Inference (NLI) skill to identify potentially dangerous outputs via undesired hypotheses, and use a mitigation process to counter-act these outputs with anti-hypothesis prompt edits, keeping the system running efficiently by only intercepting/remediating deviated answers in a reactive fashion.

Alternatively, unrestricted LLMs do not implement any mitigation mechanism and hence users may receive answers with inappropriate language. LLM creators may show a disclaimer/warning explaining the risk, but such a disclaimer doesn't solve the problem of exposing customers to inappropriate content, nor does such a disclaimer provide a path for retrieval of an appropriate answer. Existing approaches to mitigate inappropriate responses include reinforcement learning from human feedback (RLHF), and regular expression (regex) post processing. Such approaches, however, have disadvantages.

Reinforcement Learning from Human Feedback (RLHF) is a technique that rewards or penalizes the LLM based on human preferences, so that the answers can be polished/refined to remove any inappropriate content. The problem with this approach is that it is very costly (human labor), and requires high and constant maintenance. Also, when a pre-trained LLM is fine-tuned for a specific business need, the refinements introduced by RLHF may be lost due to the fine-tuning process, which makes such an approach less viable for reuse.

Regex post-processing is a rudimentary approach for ensuring inappropriate content is not returned to users. Regex post-processing employs a dictionary of keywords that are prohibited (e.g., offensive language). If any of these keywords is/are observed in the answer, then the system replaces those keywords and/or terms adjacent to those keywords with a generic answer (e.g., "As an AI model, I can't answer that") to avoid the risk of providing an inappropriate response. This approach doesn't scale well, can't cover all scenarios and may be as costly as RLHF in some circumstances.

Examples disclosed herein address the disadvantages of the aforementioned approaches by using a low-cost, low-intervention control mechanism based on a natural language inference (NLI) LLM specialized in undesired hypotheses. By doing so, several advantages are obtained. For example, specializing an NLI LLM on undesired hypotheses is less costly than RLHF (as every possible answer does not need to be ranked). Pre-trained NLI LLMs can be leveraged for the task, therefore even further reducing the cost of implementation. An NLI LLM can be re-used among different models, whereas RLHF can't be reused as an RLHF is specific to a single model. As a result, examples disclosed herein are useful for implementing the same/recycled guardrails across multiple models. Examples disclosed herein introduce anti-hypothesis prompt edits to re-generate an answer to achieve a successful (e.g., appropriate) answer, whereas alternative approaches may return a generic "error" answer (e.g., "As an AI model, I can't answer that").

FIG. 1 is a block diagram of an example guardrail platform constructed in accordance with teaching of this disclosure and shown in an example environment of use. The guardrail platform 110 of FIG. 1 may be instantiated (e.g., creating an instance of, bring into being for any length of time, materialize, implement, etc.) by programmable circuitry such as a Central Processor Unit (CPU) executing first instructions. Additionally or alternatively, the guardrail platform 110 of FIG. 1 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIG. 1 may, thus, be instantiated at the same or different times. Some or all of the circuitry of FIG. 1 may be instantiated, for example, in one or more threads executing concurrently on hardware and/or in series on hardware. Moreover, in some examples, some or all of the circuitry of FIG. 1 may be implemented by microprocessor circuitry executing instructions and/or FPGA circuitry performing operations to implement one or more virtual machines and/or containers.

Figure 2A:
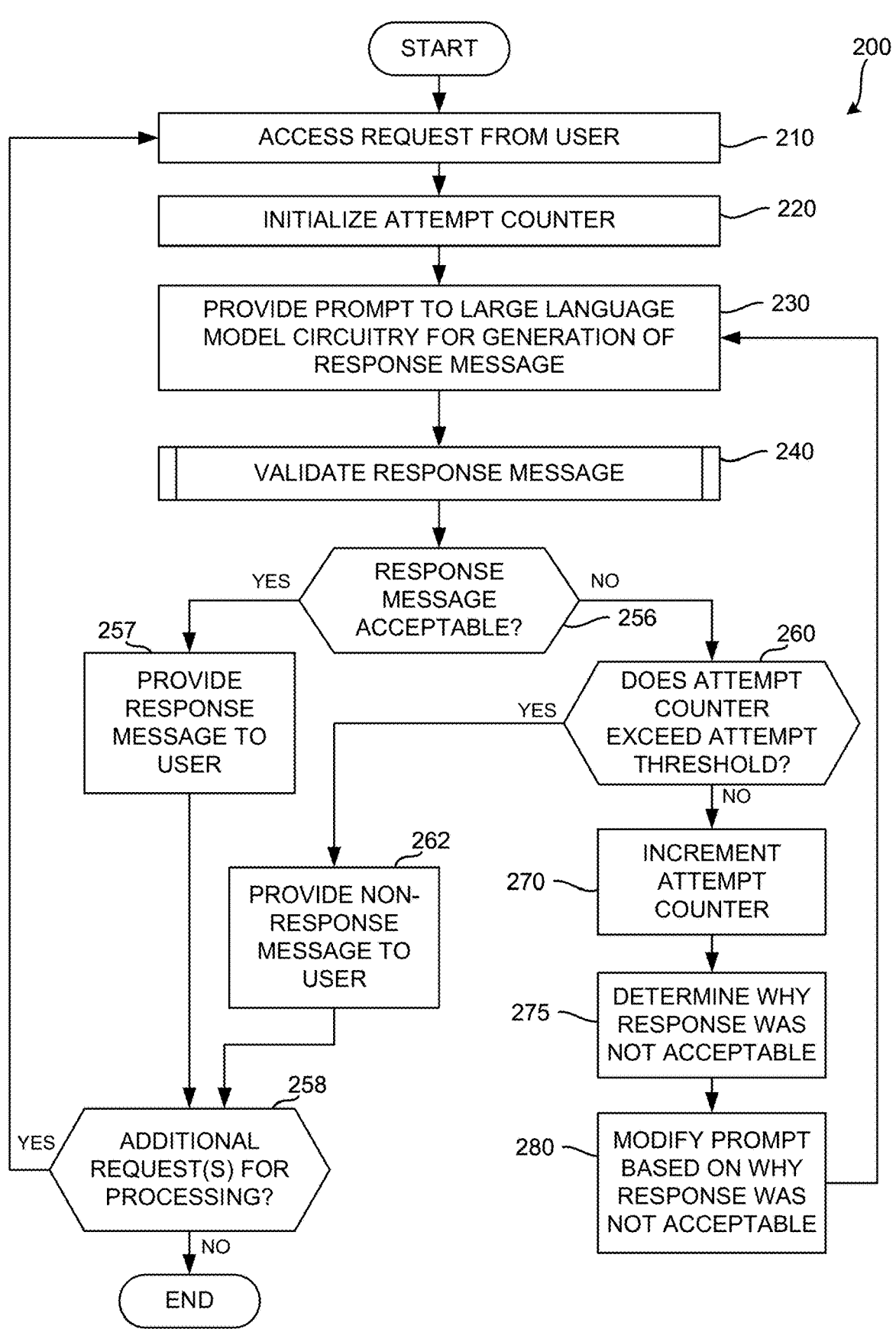
FIGS. 2A and 2B are a flowchart representative of example machine readable instructions and/or example operations that may be executed, instantiated, and/or performed by programmable circuitry to generate a response message using an LLM, with guardrails.

In some examples, the guardrail platform 110 is instantiated by programmable circuitry executing guardrail circuitry instructions and/or configured to perform operations such as those represented by the flowchart(s) of FIGS. 2A and/or 2B. In examples disclosed herein, an entity operates the guardrail platform 110 to provide a large language model service to one or more users (collectively represented in FIG. 1 by a user 102. Such an entity may be an entity that provides security services, such as, for example, ensuring that large language model responses are appropriate.

In some examples, the guardrail platform 110 is independent of a large language model service provider and, instead, operates as a middle-man, that reviews responses that are provided by a large language model service provider. However, in some examples, the entity operating the guardrail platform 110 and the large language model may be a same entity.

The users 102 of the illustrated example of FIG. 1 include any user of the guardrail platform 110. Such users may be customers of the guardrail platform 110. Such users may subscribe to the service(s) provided by the entity operating the guardrail platform 110. Alternatively, the service may be free to the end user(s). In such circumstances, the entity operating the LLM may subscribe to and/or pay for the guardrail service.

The example guardrail platform 110 of the illustrated example of FIG. 1 includes request accessor circuitry 130, large language model interface circuitry 150, large language model circuitry 155, message validator circuitry 170, prompt modifier circuitry 175, and message provider circuitry 180.

In some examples, the guardrail platform 110 includes means for accessing. For example, the means for accessing may be implemented by request accessor circuitry 130. The example request accessor circuitry 130 of the illustrated example of FIG. 1 receives a prompt from a user. In some examples, the prompt may be received via an application programming interface (API). In some other examples, the prompt may be received via a web interface. In some examples, the prompt may originate from an application (e.g., an email application) on behalf of the user.

Figure 6:
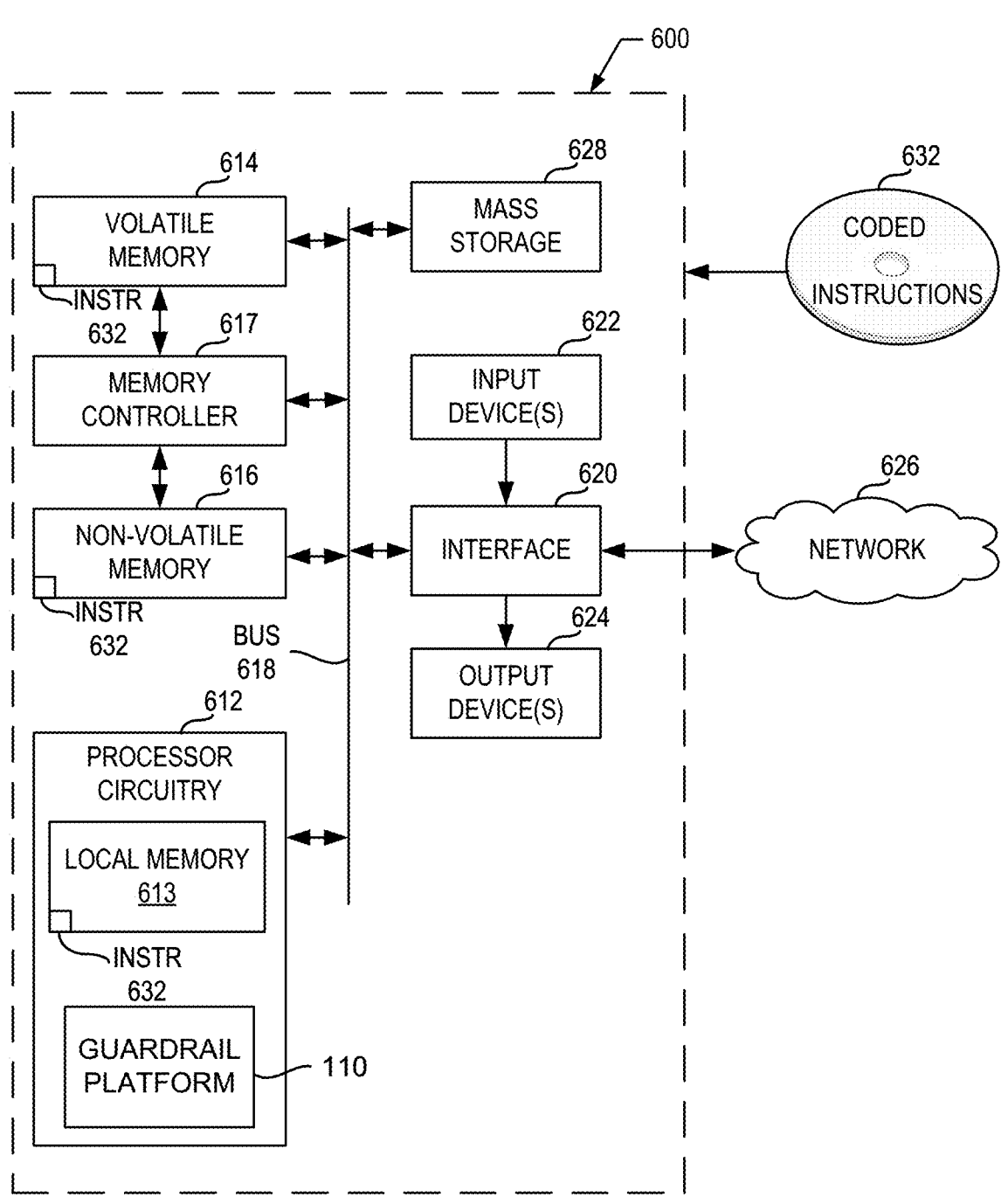
FIG. 6 is a block diagram of an example processing platform including programmable circuitry structured to execute, instantiate, and/or perform the example machine readable instructions and/or perform the example operations of FIGS. 2 and/or 2B to implement the guardrail platform 110 of FIG. 1.

In some examples, the request accessor circuitry 130 may be instantiated by programmable circuitry such as the example programmable circuitry 612 of FIG. 6. For instance, the request accessor circuitry 130 may be instantiated by the example microprocessor 700 of FIG. 7 executing machine executable instructions such as those implemented by at least block 210 of FIG. 2A. In some examples, request accessor circuitry 130 may be instantiated by hardware logic circuitry, which may be implemented by an ASIC, XPU, or the FPGA circuitry 800 of FIG. 8 configured and/or structured to perform operations corresponding to the machine readable instructions. Additionally or alternatively, the request accessor circuitry 130 may be instantiated by any other combination of hardware, software, and/or firmware. For example, the request accessor circuitry 130 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In some examples, the guardrail platform 110 includes means for interfacing with a large language model. For example, the means for interfacing may be implemented by large language model interface circuitry 150. The example large language model interface circuitry 150 of the illustrated example of FIG. 1 receives the prompt accessed by the request accessor circuitry 130 and provides the prompt to the large language model circuitry 155. In some examples, the large language model interface circuitry 150 receives a prompt that has been modified by the prompt modifier circuitry 175, and provides the modified prompt to the large language model circuitry 155. In some examples, the large language model interface circuitry 150 operates on a prompt from the message validator 170 to assist in validation of response message. Once the prompt is provided to the large language model circuitry 155, the large language model circuitry 155 provides a response to the prompt (e.g., an output of the execution of the large language model) to large language model interface circuitry 150. The example large language model interface circuitry 150 receives this response from the large language model circuitry 155. This response may then be parsed and/or utilized by other components of the guardrail platform 110. In some examples, when communicating with the large language model circuitry 155, the example large language model interface circuitry 150 identifies a model (e.g., model 155A, model 155B, etc.) that is to be used by the large language model circuitry 155 to process the prompt.

In some examples, the large language model interface circuitry 150 may be instantiated by programmable circuitry such as the example programmable circuitry 612 of FIG. 6. For instance, the large language model interface circuitry 150 may be instantiated by the example microprocessor 700 of FIG. 7 executing machine executable instructions such as those implemented by at least block 230 of FIG. 2A. In some examples, the large language model interface circuitry 150 may be instantiated by hardware logic circuitry, which may be implemented by an ASIC, XPU, or the FPGA circuitry 800 of FIG. 8 configured and/or structured to perform operations corresponding to the machine readable instructions. Additionally or alternatively, the large language model interface circuitry 150 may be instantiated by any other combination of hardware, software, and/or firmware. For example, the large language model interface circuitry 150 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In some examples, the guardrail platform 110 includes means for inferring. For example, the means for inferring may be implemented by LLM circuitry 155. The example large language model circuitry 155 of the illustrated example of FIG. 1 executes a large language model to transform an input prompt into an output message. In the illustrated example of FIG. 1, the example large language model circuitry 155 may execute a select model at the direction of the large language model interface circuitry 150. For example, a first model 155A may be utilized if the large language model interface circuitry 150 is attempting to have a response generated based on a user prompt (or a modification thereof), whereas a second model 155B may be utilized if the large language model interface circuitry 150 is attempting to have the LLM circuitry 155 validate a message on behalf of the message validator 170.

A large language model (LLM) operates by utilizing a neural network architecture known as a Transformer. LLMs are designed to generate human-like text based on a vast amount of data on which the LLM has been trained. In the illustrated example of FIG. 1, the LLM circuitry 155 is illustrated at the edge of the guardrail platform 110 to represent that the large language model circuitry 155 may be executed/implemented either locally to the guardrail platform 110 or at a computing system remote from the guardrail platform 110. For example, large language models may be executed in a cloud setting (e.g., remotely from the guardrail platform 110). Remote execution offers some advantages including, for example, that the LLM can be accessed from anywhere, providing scalability and ease of use. Cloud-based models are usually more powerful than locally-executed models, as cloud-based models typically leverage high-performance hardware and are frequently (e.g., continuously) updated with the latest improvements and fine-tuning. However, cloud-based models may raise concerns about data privacy, latency, and cost, as entities typically pay for the computational resources they consume (e.g., entities pay for use of the cloud-based model).

On the other hand, executing large language models locally provides an entity with more control over their data, and potentially lower latency for inference. Local execution can also work offline, which is beneficial in scenarios with limited Internet access or where data privacy is important. However, local execution typically requires powerful hardware, significant storage, and regular updates to maintain model performance.

In some examples, the LLM circuitry 155 may be instantiated by programmable circuitry such as the example programmable circuitry 612 of FIG. 6. For instance, the LLM circuitry 155 may be instantiated by the example microprocessor 700 of FIG. 7. In some examples, the LLM circuitry 155 may be instantiated by hardware logic circuitry, which may be implemented by an ASIC, XPU, or the FPGA circuitry 800 of FIG. 8 configured and/or structured to perform operations corresponding to the machine readable instructions. Additionally or alternatively, the LLM circuitry 155 may be instantiated by any other combination of hardware, software, and/or firmware. For example, the LLM circuitry 155 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In some examples, the guardrail platform 110 includes means for validating a message. For example, the means for validating may be implemented by message validator circuitry 170. The example message validator circuitry 170 of the illustrated example of FIG. 1 reviews the message returned to the large language model interface circuitry 150 to determine if the message is acceptable for sending to the user 102. In some examples, the message validator circuitry 170 augments the message by placing the message received from the large language model circuitry 155 into a prompt template that is designed to request the large language model circuitry 155 to determine whether any terms, phrases, sayings, etc. are included in the message that indicate that the message is inappropriate. Such phrases may include, for example, offensive language, slang or unprofessionally written language, an answer that does not relate to a topic at hand (e.g., the answer does not relate to cybersecurity, when it should), the answer contains harmful suggestions or advice, the answer judges a person, etc.

In some examples, the message validator circuitry 170 may be instantiated by programmable circuitry such as the example programmable circuitry 612 of FIG. 6. For instance, the message validator circuitry 170 may be instantiated by the example microprocessor 700 of FIG. 7 executing machine executable instructions such as those implemented by at least blocks 240, 256, 275 of FIGS. 2A and/or 2B. In some examples, the message validator circuitry 170 may be instantiated by hardware logic circuitry, which may be implemented by an ASIC, XPU, or the FPGA circuitry 800 of FIG. 8 configured and/or structured to perform operations corresponding to the machine readable instructions. Additionally or alternatively, the message validator circuitry 170 may be instantiated by any other combination of hardware, software, and/or firmware. For example, the message validator circuitry 170 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In some examples, the message validator circuitry 170 may utilize the large language model interface circuitry 150 to analyze the message to determine whether the message is appropriate. In some examples, the message validator circuitry 170 causes the large language model circuitry 155 to utilize a different model than the model that was used to generate the response message. The example message validator circuitry reviews a validation response message to determine whether the original response message is appropriate. If the message is not acceptable, the message validator circuitry 170 causes the prompt modifier circuitry 175 to modify the original prompt based on a reason for why the message was not appropriate. In some examples, an anti-hypothesis is inserted into the prompt to instruct the LLM circuitry 155 to generate a subsequent response that is more likely to be appropriate. This message validator circuitry 170 continues to validate and direct the modification of prompts until an appropriate response is received or until an attempt counter reaches an attempt threshold. In some examples, an attempt counter is maintained by the message validator circuitry 170 and reviewed to determine whether a threshold number of attempts to obtain an appropriate message has been reached. If the message is acceptable, the message is provided to the message provider circuitry 180 for relay to the user 102.

In some examples, the guardrail platform 110 includes means for modifying a prompt. For example, the means for modifying may be implemented by prompt modifier circuitry 175. The example prompt modifier circuitry 175 of the illustrated example of FIG. 1 modifies a prompt at the direction of the message validator circuitry 170. An example of a modified prompt is described below in connection with FIG. 5. In general, the example prompt modifier circuitry 175 inserts an additional directive that causes the LLM circuitry 155, when processing the modified prompt to generate a response that is more likely to be appropriate. For example, if the message validator circuitry 170 determines that the message is not appropriate because the answer contains offensive language, the example prompt modifier circuitry 175 may modify the prompt to request that offensive language not be used. The modified prompt is then provided to the LLM circuitry 155 via the large language model interface circuitry 150 for generation of a subsequent response message.

In some examples, the prompt modifier circuitry 175 may be instantiated by programmable circuitry such as the example programmable circuitry 612 of FIG. 6. For instance, the prompt modifier circuitry 175 may be instantiated by the example microprocessor 700 of FIG. 7 executing machine executable instructions such as those implemented by at least block 280 of FIG. 2A. In some examples, the prompt modifier circuitry 175 may be instantiated by hardware logic circuitry, which may be implemented by an ASIC, XPU, or the FPGA circuitry 800 of FIG. 8 configured and/or structured to perform operations corresponding to the machine readable instructions. Additionally or alternatively, the prompt modifier circuitry 175 may be instantiated by any other combination of hardware, software, and/or firmware. For example, the prompt modifier circuitry 175 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In some examples, the guardrail platform 110 includes means for providing a response. For example, the means for providing may be implemented by message provider circuitry 180. The example message provider circuitry 180 of the illustrated example of FIG. 1 provides a response message to the user 102. In examples where the message from the LLM is found to be appropriate by the message validator circuitry 170, the message provider circuitry 180 may provide the message to the user 102. In alternative examples where the message from the LLM is found to not be appropriate by the message validator circuitry 170, the response user 102 may be provided with a message indicating that an appropriate response could not be created (e.g., "we can't answer that").

In some examples, the message provider circuitry 180 may be instantiated by programmable circuitry such as the example programmable circuitry 612 of FIG. 6. For instance, the message provider circuitry 180 may be instantiated by the example microprocessor 700 of FIG. 7 executing machine executable instructions such as those implemented by at least blocks 257, 262 of FIG. 2A. In some examples, the message provider circuitry 180 may be instantiated by hardware logic circuitry, which may be implemented by an ASIC, XPU, or the FPGA circuitry 800 of FIG. 8 configured and/or structured to perform operations corresponding to the machine readable instructions. Additionally or alternatively, the message provider circuitry 180 may be instantiated by any other combination of hardware, software, and/or firmware. For example, the message provider circuitry 180 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

While an example manner of implementing the guardrail platform 110 of FIG. 1 is illustrated in FIG. 1, one or more of the elements, processes, and/or devices illustrated in FIG. 1 may be combined, divided, re-arranged, omitted, eliminated, and/or implemented in any other way. Further, the example request accessor circuitry 130, the example large language model interface circuitry 150, the example LLM circuitry 155, the example message validator circuitry 170, the example prompt modifier circuitry 175, the example message provider circuitry 180, and/or, more generally, the example guardrail platform 110 of FIG. 1, may be implemented by hardware alone or by hardware in combination with software and/or firmware. Thus, for example, any of the example request accessor circuitry 130, the example large language model interface circuitry 150, the example LLM circuitry 155, the example message validator circuitry 170, the example prompt modifier circuitry 175, the example message provider circuitry 180, and/or, more generally, the example guardrail platform 110, could be implemented by programmable circuitry in combination with machine readable instructions (e.g., firmware or software), processor circuitry, analog circuit(s), digital circuit(s), logic circuit(s), programmable processor(s), programmable micro-controller(s), graphics processing unit(s) (GPU(s)), digital signal processor(s) (DSP(s)), ASIC(s), programmable logic device(s) (PLD(s)), and/or field programmable logic device(s) (FPLD(s)) such as FPGAs. Further still, the example guardrail platform 110 of FIG. 1 may include one or more elements, processes, and/or devices in addition to, or instead of, those illustrated in FIG. 1, and/or may include more than one of any or all of the illustrated elements, processes and devices.

Flowchart(s) representative of example machine readable instructions, which may be executed by programmable circuitry to implement and/or instantiate the guardrail platform 110 of FIG. 1 and/or representative of example operations which may be performed by programmable circuitry to implement and/or instantiate the guardrail platform 110 of FIG. 1, are shown in FIG. 2A. The machine readable instructions may be one or more executable programs or portion(s) of one or more executable programs for execution by programmable circuitry such as the programmable circuitry 612 shown in the example processor platform 600 discussed below in connection with FIG. 6 and/or may be one or more function(s) or portion(s) of functions to be performed by the example programmable circuitry (e.g., an FPGA) discussed below in connection with FIGS. 7 and/or 8. In some examples, the machine readable instructions cause an operation, a task, etc., to be carried out and/or performed in an automated manner in the real world. As used herein, "automated" means without human involvement.

The program may be embodied in instructions (e.g., software and/or firmware) stored on one or more non-transitory computer readable and/or machine readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer readable and/or machine readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer readable storage medium may include one or more mediums. Further, although the example program is described with reference to the flowchart(s) illustrated in FIGS. 2A and/or 2B, many other methods of implementing the example guardrail platform 110 may alternatively be used. For example, the order of execution of the blocks of the flowchart(s) may be changed, and/or some of the blocks described may be changed, eliminated, or combined. Additionally or alternatively, any or all of the blocks of the flow chart may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine readable instructions described herein may be stored in one or more of a compressed format, an encrypted format, a fragmented format, a compiled format, an executable format, a packaged format, etc. Machine readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine readable instructions may be fragmented and stored on one or more storage devices, disks and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of computer-executable and/or machine executable instructions that implement one or more functions and/or operations that may together form a program such as that described herein.

In another example, the machine readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable, computer readable and/or machine readable media, as used herein, may include instructions and/or program(s) regardless of the particular format or state of the machine readable instructions and/or program(s).

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 2A and/or 2B may be implemented using executable instructions (e.g., computer readable and/or machine readable instructions) stored on one or more non-transitory computer readable and/or machine readable media. As used herein, the terms non-transitory computer readable medium, non-transitory computer readable storage medium, non-transitory machine readable medium, and/or non-transitory machine readable storage medium are expressly defined to include any type of computer readable storage device and/or storage disk and to exclude propagating signals and to exclude transmission media. Examples of such non-transitory computer readable medium, non-transitory computer readable storage medium, non-transitory machine readable medium, and/or non-transitory machine readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer readable storage device" and "non-transitory machine readable storage device" are defined to include any physical (mechanical, magnetic and/or electrical) hardware to retain information for a time period, but to exclude propagating signals and to exclude transmission media. Examples of non-transitory computer readable storage devices and/or non-transitory machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer-readable instructions, machine-readable instructions, etc.

Figure 2B:
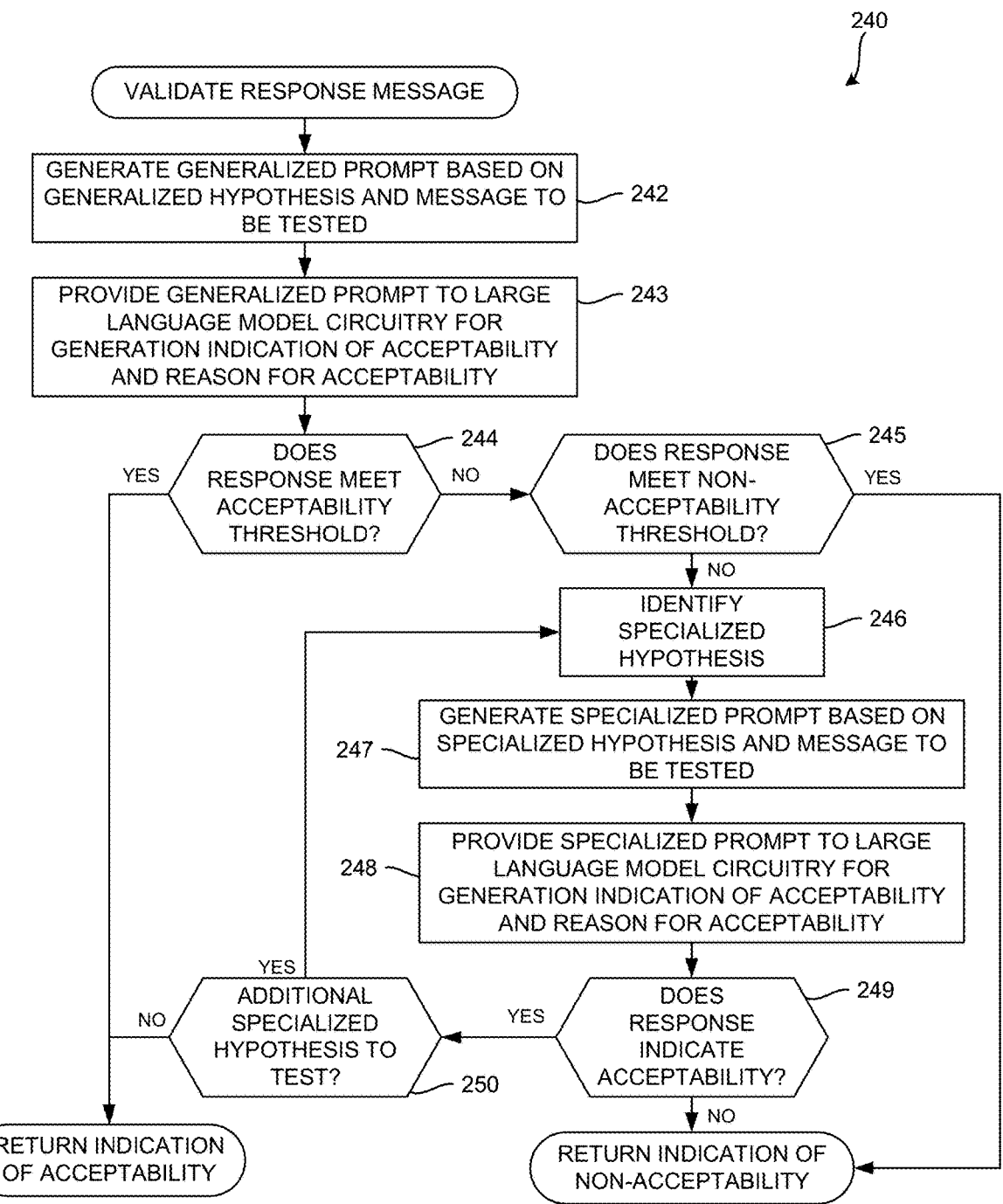

FIGS. 2A and 2B are a flowchart representative of example machine readable instructions and/or example operations 200 that may be executed, instantiated, and/or performed by programmable circuitry to generate a response message using an LLM, with guardrails. The example machine-readable instructions and/or the example operations 200 of FIG. 2A begin at block 210, at which the request accessor circuitry 130 accesses a request from a user. (Block 210). The example request may be a prompt for execution by an LLM to generate a response. In examples disclosed herein, the request message is received from a messaging client and/or messaging server (e.g., an email client application and/or email server) with a request to validate whether a message (e.g., an email message) is spam. While examples are disclosed herein in the context of explaining spam messages, other types of messages and/or purposes may additionally or alternatively be used. For example, a threat assessment may be requested in response to detection of execution of malicious code (or potential execution of malicious code).

The example message validator circuitry 170 initializes an attempt counter. (Block 220). The example attempt counter is used to track how many attempts at obtaining an appropriate message have been made.

The example large language model interface circuitry 150 provides the prompt to the LLM circuitry 155 for generation of a response message. (Block 230). In examples disclosed herein, a first model is executed by the LLM circuitry 155 to generate the response message. The response message is provided to the message validator circuitry 170 for validation.

The example message validator circuitry 170 validates the response message to determine if the message is appropriate. (Block 240). An example approach for validating the response message is described below in connection with FIG. 2B. In examples disclosed herein, the example message validator circuitry 170 prepares one or more validation prompts that is/are provided to the LLM circuitry 155 via the large language model interface circuitry 150. The validation prompt(s) cause the LLM circuitry 155 to test respective hypothesis using the response message. For example, the validation prompt may request that the LLM circuitry 155 reply with an indication of whether the response message included inappropriate content and, if so, why the content was inappropriate. In examples disclosed herein, the LLM circuitry 155 utilizes a natural language interface (NLI) that is available in a second model 155B. In examples disclosed herein, the first model 155A is different from the second model 155B.

In examples disclosed herein, there may be many different hypotheses to be tested. For example, the message validator circuitry 170 may seek to determine whether inappropriate content is included in the response message, whether offensive language is included in the response message, whether the response message contains slang or unprofessionally written language, whether the response message relates to a topic at hand (e.g., does the response message relate to cybersecurity), does the response message include harmful suggestions or advice, does the response message judge a person mentioned in the response message, etc. In some examples, an administrator of the guardrail platform 110 may administer the list of premises to be tested.

To validate the response message, individual validation prompts for each of the hypotheses may be provided to the LLM circuitry 155 at the request of the message validator circuitry 170. In some examples, once a first hypothesis is identified as having unacceptable content, the message validator circuitry 170 identifies the message as having unacceptable content, and continues to block 256. In some examples, multiple different hypotheses are tested to identify any hypothesis that might indicate an inappropriate response message. For example, a first hypothesis that the message includes offensive language may be tested in addition to a second hypothesis that the message includes slang wording. In some examples, a positive identification of the offensive language and slang wording may result in both anti-hypothesis being utilized to modify the original prompt.

The example message validator circuitry 170 evaluates the result(s) of the premises to determine whether the response message is acceptable. (Block 256). If the message is acceptable (e.g., block 256 returns a result of YES, indicating that none of the premises tested at block 240 returned a result indicating non-acceptability of the response message), the example message provider circuitry 180 provides the response message to the user. (Block 257). The example request accessor circuitry 130 then awaits additional requests for processing. (Block 258). Upon receipt of a subsequent request, control returns to block 210, where the request is accessed and the process re-starts.

If, at block 256, the message validator circuitry 170 determines that the response message is not acceptable (e.g., block 256 returns a result of NO, indicating that at least one of the premises tested at block 240 returned a result indicating non-acceptability of the response message), the message validator circuitry 170 compares a value of the attempt counter to an attempt threshold. (Block 260). If the attempt counter does not meet or exceed the attempt threshold (e.g., block 260 returns a result of NO), the example message validator circuitry 170 increments the attempt counter. (Block 270). The example message validator circuitry 170 determines why the response was not acceptable (e.g., based on the testing of the premises at block 240). (Block 275). For example, the message validator circuitry 170 may identify which premises tested at block 240 indicated that the message was not acceptable.

Based on the identified premises, the example message validator circuitry 170 directs the prompt modifier circuitry 175 to modify the prompt based on why the response was not acceptable. (Block 280). To modify the prompt, the example prompt modifier circuitry 175 adds (e.g., appends, inserts, prepends, etc.) an anti-hypothesis to the prompt. The anti-hypothesis is based on the hypothesis tested in a corresponding premise. For example, if the hypothesis "the answer contains offensive language" returns a result of true (indicating non-acceptability of the response), an anti-hypothesis of "the answer should not contain offensive language." is added to the prompt. In such an example, the modification of the prompt is implicit. Such modification is implicit because it is not shown to the user, but instead is silently injected into the prompt before the (modified) prompt is provided to the LLM circuitry 155. In such an example, the (modified) prompt includes the anti-hypothesis that negate the hypothesis that indicated that the prior response message was unacceptable.

Control then returns to block 230, where the (modified) prompt is provided to the LLM circuitry 155 (utilizing model 155A) to generate a subsequent response. The example process of blocks 230-280 is repeated until either an acceptable response message is received (block 256 returns a result of YES), or the attempt counter meets or exceeds the attempt threshold (block 260 returns a result of YES).

In some examples, the anti-hypothesis is a negative modifier to the prompt (e.g., "the response must not include offensive language"), while in other examples, the anti-hypothesis is a positive modifier to the prompt (e.g., the response must be in English).

In some examples, multiple hypotheses may indicate that the response message is not acceptable. In such a situation, multiple anti-hypotheses may be added to the modified prompt. For example, the prompt may be modified to add "the response must not use offensive language and must be presented in Spanish").

Returning to block 260, if the attempt counter meets or exceeds the attempt threshold (e.g., block 260 returns a result of YES), the example message provider circuitry 180 returns a message indicating that an acceptable response message could not be generated. (Block 262). Control then proceeds to block 258 where the request accessor circuitry 130 awaits a subsequent request for processing.

While the illustrated example of FIG. 2, is illustrated as a serial process that handles one request at a time, in practice, multiple requests may be handled simultaneously.

Returning to block 240, FIG. 2B illustrates an example approach for validating the response message. In some implementations, different approaches for validating the response message may be used. In the illustrated example of FIG. 2B, the example prompt modifier circuitry 175 generates a generalized prompt based on a generalized hypothesis. (Block 242). The generalized prompt is intended to detect general unacceptability (e.g., inappropriateness) including, for example, profanity, slang terms, or personally identifiable information. The LLM interface circuitry 150 provides the generalized prompt to the LLM circuitry 155 for generation of an indication of acceptability score and/or a reason for acceptability. (Block 243). In some examples, the LLM circuitry may be asked to rate how acceptable the message is on a scale of zero to one (e.g., zero representing an unacceptable message, and one representing an acceptable message). However, any other scale may additionally or alternatively be used. In some examples, a reason for the acceptability score may also be provided.

The result of the LLM circuitry 155 is evaluated to determine whether the acceptability rating meets or exceeds a threshold acceptability score. (Block 244). In some examples, the threshold acceptability score may be represented by a value of nine tenths (e.g., on the scale of zero to one). However, any other acceptability threshold may alternatively be used. In this manner, an acceptability rating that meets or exceeds the threshold acceptability score (e.g., when block 244 returns a result of YES) is considered an acceptable (e.g., appropriate) response, and a result indicating the acceptability is returned (e.g., returning to block 256 of FIG. 2A).

In some examples, the response may return an acceptability score that does not meet the acceptability threshold (e.g., block 244 may return a result of NO). The example message validator circuitry 170 determines whether the acceptability score meets a non-acceptability threshold. In the illustrated example of FIG. 2B, the non-acceptability threshold is a value of three tenths. Thus, the example message validator circuitry 170 identifies that the acceptability score meets the non-acceptability threshold when the acceptability score is less than or equal to three tenths. If the acceptability score is less than or equal to the non-acceptability threshold (e.g., block 245 returns a result of YES), the example message provider circuitry 180 returns a result indicating the non-acceptability of the message.

In some examples, a response message might not be clearly acceptable (e.g., having an acceptability score less than the acceptability threshold of nine tenths) and also might not be clearly unacceptable (e.g., having an acceptability score that is greater than the non-acceptability threshold of three tenths). In such examples, additional hypothesis testing may be performed in an attempt to distinguish between whether the response message is acceptable or not. If the acceptability score does not meet the non-acceptability threshold (e.g., block 245 returns a result of NO), the example prompt modifier circuitry 175 identifies a specialized hypothesis to test. (Block 246).

The specialized hypothesis, in contrast to the generalized hypothesis described above, is intended to test for a specific type of issue in the message that would make the message unacceptable. For example, whereas the generalized prompt tests for any of profanity, slang terms, or personally identifiable information, the specialized hypothesis may test solely for profanity (and/or particular types of profanity). The example prompt modifier circuitry 175 generates the prompt based on the specialized hypothesis and the message to be tested. (Block 247). The example large language model interface circuitry 150 provides the specific prompt to the LLM circuitry 155 for generation of an indication of acceptability score and/or a reason for acceptability. (Block 248). In some examples, the LLM circuitry may be asked to rate how acceptable the message is on a scale of zero to one (e.g., zero representing an unacceptable message, and one representing an acceptable message). However, any other scale may additionally or alternatively be used. In some examples, a reason for the acceptability score may also be provided.

The example message validator circuitry 170 evaluates whether the response to the specific prompt indicates that the message is acceptable. (Block 249). If the response indicates that the message is not acceptable (e.g., the acceptability score is less than the non-acceptability threshold), the example message provider circuitry 180 returns a result indicating the non-acceptability of the message.

When testing a specialized hypothesis, the tested hypothesis naturally tests for a limited set of reasons for why a message may be considered unacceptable. For example, a hypothesis testing for whether the message includes profanity might indicate that the message is acceptable (e.g., no profanity is included). However, the message might actually include personally identifiable information and may, therefore, be unacceptable. To account for this, in response to a determination that the message is acceptable based on the specific prompt (e.g., block 249 returns a result of YES), it is determined whether there are any additional specialized hypotheses to be tested. If additional specialized hypothesis exist to be tested (e.g., block 250 returns a result of YES), a subsequent specialized hypothesis is identified (Block 246), and the process of blocks 246-250 is repeated. In some examples, a threshold number of specialized hypotheses are identified for testing (e.g., five hypotheses, ten hypotheses, etc.) Such hypotheses may be selected (and/or the order in which they are selected) based on, for example, their likelihood of detecting that a message is unacceptable. If, after testing a threshold number of specialized hypotheses (e.g., block 250 returns a result of NO), the example message provider 180 returns a result indicating the acceptability of the message. Control then returns to block 256 of FIG. 2A.

FIG. 3 is a diagram illustrating an example prompt 310 and an example response 320. In the illustrated example of FIG. 3, the response is appropriate, as it provides a non-offensive and instructive response to explain why the passage provided in the prompt is a scam. This example represents a scenario where the example guardrail platform 110 would check for an unacceptable response, but would not intervene, as the answer is not unacceptable. Unfortunately, not all messages returned by the LLM circuitry 155 may be as well stated as in the example response 320 of FIG. 3.

In contrast, FIG. 4 is a diagram illustrating an example prompt 410 and an example response 420. The example prompt 410 shows a scenario where the prompt 310 of FIG. 3 is slightly/innocently modified. Now, the response message 420, contains inappropriate content and therefore the guardrail platform 110 detects such occurrence when evaluating the undesired hypotheses. Since the hypothesis "contains offensive language" is validated, then the remediation mechanism is engaged by introducing an implicit prompt edit as shown in FIG. 5, below.

FIG. 5 is a diagram illustrating a modified prompt 510 and example response 520. After the guardrail platform 110 re-generates the answer, it can be observed that the violation (offensive language) is no longer present, and the response message 520 can be provided to the user 102.

By way of explanation, one may think that it would be better to simply edit all prompts to include all possible anti-hypotheses from the beginning, instead of having to run the second NLI LLM model (e.g., model 155B). However, this would not be desired because (a) one could have hundreds of undesired hypotheses, which could exceed the prompt limit, (b) unnecessarily adding all possible anti-hypotheses edits in the prompt significantly increases the computational cost of the text generation task, which in turns increases monetary cost and decreases the LLM responsiveness (latency, time to respond), (c) adding all anti-hypotheses could lead to unintended consequences as the LLM answer may get extremely restrictive/limited (no margin for creativity) which in turns provides very poor answers to the prompts.

To that end, example approaches disclosed herein utilize daisy-chaining of the original answer with the NLI LLM hypotheses check (performed by the message validator circuitry 170) to ensure implicit prompt modifications are done only when necessary and in a limited fashion, providing minimum computational overhead, low operational cost, and high text generation responsiveness.

While example approaches disclosed herein introduce mechanisms that can overcome some of the limitations of existing approaches, in some examples, other approaches may be utilized in combination with the example approaches disclosed herein. For example, RLHF may be utilized as a first-pass to detect words and/or phrases that are identified as inappropriate. If such a first-pass were to indicate that no prohibited words and/or phrases were included, a second determination (e.g., utilizing the message validator circuitry 170 disclosed herein) might then be performed.

FIG. 6 is a block diagram of an example programmable circuitry platform 600 structured to execute and/or instantiate the example machine-readable instructions and/or the example operations of FIG. 2 to implement the guardrail platform 110 of FIG. 1. The programmable circuitry platform 600 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing and/or electronic device.

The programmable circuitry platform 600 of the illustrated example includes programmable circuitry 612. The programmable circuitry 612 of the illustrated example is hardware. For example, the programmable circuitry 612 can be implemented by one or more integrated circuits, logic circuits, FPGAs, microprocessors, CPUs, GPUs, DSPs, and/or microcontrollers from any desired family or manufacturer. The programmable circuitry 612 may be implemented by one or more semiconductor based (e.g., silicon based) devices. In this example, the programmable circuitry 612 implements the example guardrail platform 110.

The programmable circuitry 612 of the illustrated example includes a local memory 613 (e.g., a cache, registers, etc.). The programmable circuitry 612 of the illustrated example is in communication with main memory 614, 616, which includes a volatile memory 614 and a non-volatile memory 616, by a bus 618. The volatile memory 614 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 616 may be implemented by flash memory and/or any other desired type of memory device. Access to the main memory 614, 616 of the illustrated example is controlled by a memory controller 617. In some examples, the memory controller 617 may be implemented by one or more integrated circuits, logic circuits, microcontrollers from any desired family or manufacturer, or any other type of circuitry to manage the flow of data going to and from the main memory 614, 616.

The programmable circuitry platform 600 of the illustrated example also includes interface circuitry 620. The interface circuitry 620 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 622 are connected to the interface circuitry 620. The input device(s) 622 permit(s) a user (e.g., a human user, a machine user, etc.) to enter data and/or commands into the programmable circuitry 612. The input device(s) 622 can be implemented by, for example, an audio sensor, a microphone, a camera (still or video), a keyboard, a button, a mouse, a touchscreen, a trackpad, a trackball, an isopoint device, and/or a voice recognition system.

One or more output devices 624 are also connected to the interface circuitry 620 of the illustrated example. The output device(s) 624 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 620 of the illustrated example, thus, typically includes a graphics driver card, a graphics driver chip, and/or graphics processor circuitry such as a GPU.

The interface circuitry 620 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 626. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 600 of the illustrated example also includes one or more mass storage discs or devices 628 to store firmware, software, and/or data. Examples of such mass storage discs or devices 628 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

The machine readable instructions 632, which may be implemented by the machine readable instructions of FIG. 2, may be stored in the mass storage device 628, in the volatile memory 614, in the non-volatile memory 616, and/or on at least one non-transitory computer readable storage medium such as a CD or DVD which may be removable.

Figure 7:
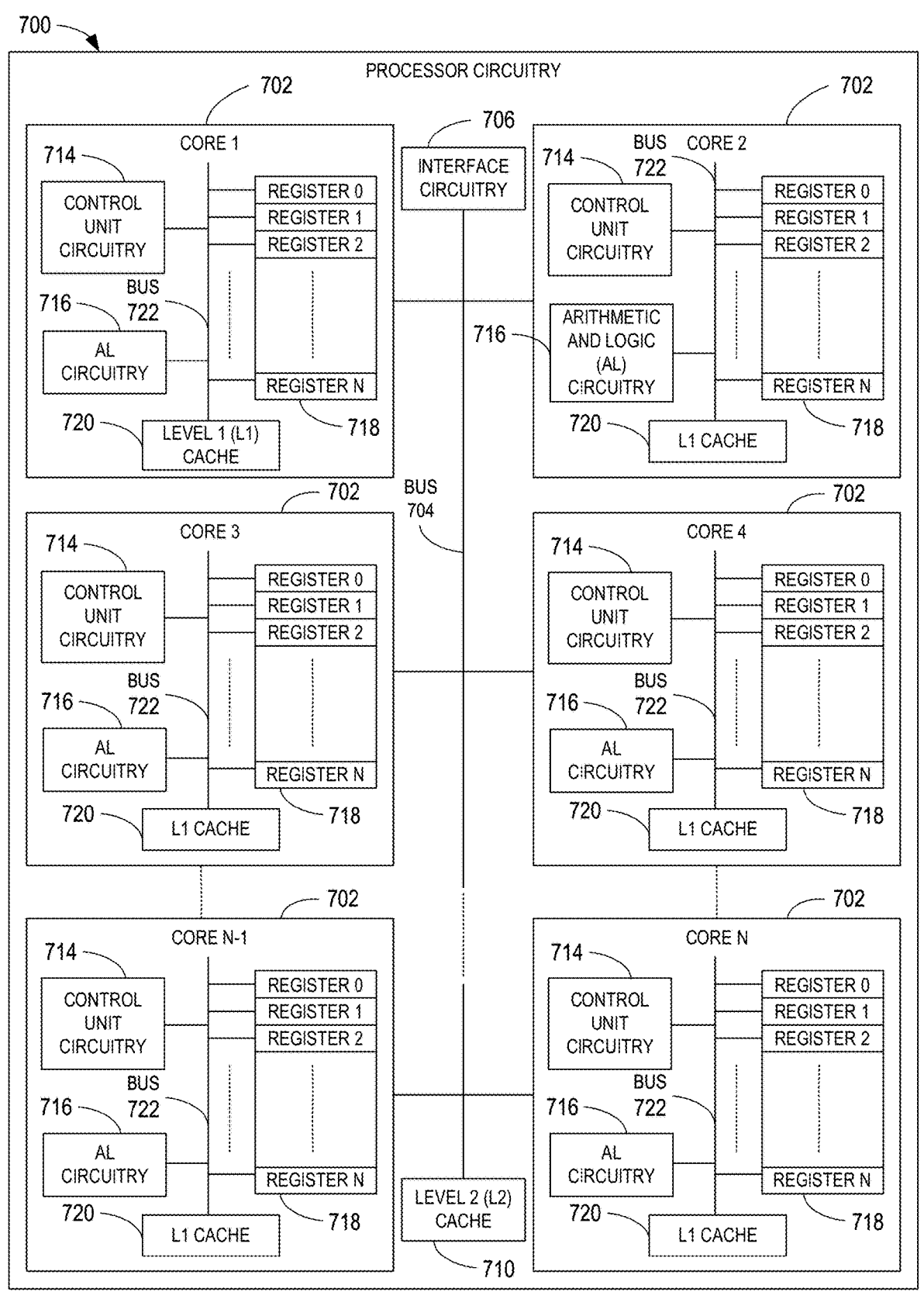
FIG. 7 is a block diagram of an example implementation of the programmable circuitry of FIG. 6.

FIG. 7 is a block diagram of an example implementation of the programmable circuitry 612 of FIG. 6. In this example, the programmable circuitry 612 of FIG. 6 is implemented by a microprocessor 700. For example, the microprocessor 700 may be a general-purpose microprocessor (e.g., general-purpose microprocessor circuitry). The microprocessor 700 executes some or all of the machine-readable instructions of the flowchart of FIG. 2 to effectively instantiate the circuitry of FIG. 2 as logic circuits to perform operations corresponding to those machine readable instructions. In some such examples, the circuitry of FIG. 1 is instantiated by the hardware circuits of the microprocessor 700 in combination with the machine-readable instructions. For example, the microprocessor 700 may be implemented by multi-core hardware circuitry such as a CPU, a DSP, a GPU, an XPU, etc. Although it may include any number of example cores 702 (e.g., 1 core), the microprocessor 700 of this example is a multi-core semiconductor device including N cores. The cores 702 of the microprocessor 700 may operate independently or may cooperate to execute machine readable instructions. For example, machine code corresponding to a firmware program, an embedded software program, or a software program may be executed by one of the cores 702 or may be executed by multiple ones of the cores 702 at the same or different times. In some examples, the machine code corresponding to the firmware program, the embedded software program, or the software program is split into threads and executed in parallel by two or more of the cores 702. The software program may correspond to a portion or all of the machine readable instructions and/or operations represented by the flowchart of FIG. 2.

The cores 702 may communicate by a first example bus 704. In some examples, the first bus 704 may be implemented by a communication bus to effectuate communication associated with one(s) of the cores 702. For example, the first bus 704 may be implemented by at least one of an Inter-Integrated Circuit (I2C) bus, a Serial Peripheral Interface (SPI) bus, a PCI bus, or a PCIe bus. Additionally or alternatively, the first bus 704 may be implemented by any other type of computing or electrical bus. The cores 702 may obtain data, instructions, and/or signals from one or more external devices by example interface circuitry 706. The cores 702 may output data, instructions, and/or signals to the one or more external devices by the interface circuitry 706. Although the cores 702 of this example include example local memory 720 (e.g., Level 1 (L1) cache that may be split into an L1 data cache and an L1 instruction cache), the microprocessor 700 also includes example shared memory 710 that may be shared by the cores (e.g., Level 2 (L2 cache)) for high-speed access to data and/or instructions. Data and/or instructions may be transferred (e.g., shared) by writing to and/or reading from the shared memory 710. The local memory 720 of each of the cores 702 and the shared memory 710 may be part of a hierarchy of storage devices including multiple levels of cache memory and the main memory (e.g., the main memory 614, 616 of FIG. 6). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 702 may be referred to as a CPU, DSP, GPU, etc., or any other type of hardware circuitry. Each core 702 includes control unit circuitry 714, arithmetic and logic (AL) circuitry (sometimes referred to as an ALU) 716, a plurality of registers 718, the local memory 720, and a second example bus 722. Other structures may be present. For example, each core 702 may include vector unit circuitry, single instruction multiple data (SIMD) unit circuitry, load/store unit (LSU) circuitry, branch/jump unit circuitry, floating-point unit (FPU) circuitry, etc. The control unit circuitry 714 includes semiconductor-based circuits structured to control (e.g., coordinate) data movement within the corresponding core 702. The AL circuitry 716 includes semiconductor-based circuits structured to perform one or more mathematic and/or logic operations on the data within the corresponding core 702. The AL circuitry 716 of some examples performs integer based operations. In other examples, the AL circuitry 716 also performs floating-point operations. In yet other examples, the AL circuitry 716 may include first AL circuitry that performs integer-based operations and second AL circuitry that performs floating-point operations. In some examples, the AL circuitry 716 may be referred to as an Arithmetic Logic Unit (ALU).

The registers 718 are semiconductor-based structures to store data and/or instructions such as results of one or more of the operations performed by the AL circuitry 716 of the corresponding core 702. For example, the registers 718 may include vector register(s), SIMD register(s), general-purpose register(s), flag register(s), segment register(s), machine-specific register(s), instruction pointer register(s), control register(s), debug register(s), memory management register(s), machine check register(s), etc. The registers 718 may be arranged in a bank as shown in FIG. 7. Alternatively, the registers 718 may be organized in any other arrangement, format, or structure, such as by being distributed throughout the core 702 to shorten access time. The second bus 722 may be implemented by at least one of an I2C bus, a SPI bus, a PCI bus, or a PCIe bus.

Each core 702 and/or, more generally, the microprocessor 700 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 700 is a semiconductor device fabricated to include many transistors interconnected to implement the structures described above in one or more integrated circuits (ICs) contained in one or more packages.

The microprocessor 700 may include and/or cooperate with one or more accelerators (e.g., acceleration circuitry, hardware accelerators, etc.). In some examples, accelerators are implemented by logic circuitry to perform certain tasks more quickly and/or efficiently than can be done by a general-purpose processor. Examples of accelerators include ASICs and FPGAs such as those discussed herein. A GPU, DSP and/or other programmable device can also be an accelerator. Accelerators may be on-board the microprocessor 700, in the same chip package as the microprocessor 700 and/or in one or more separate packages from the microprocessor 700.

Figure 8:
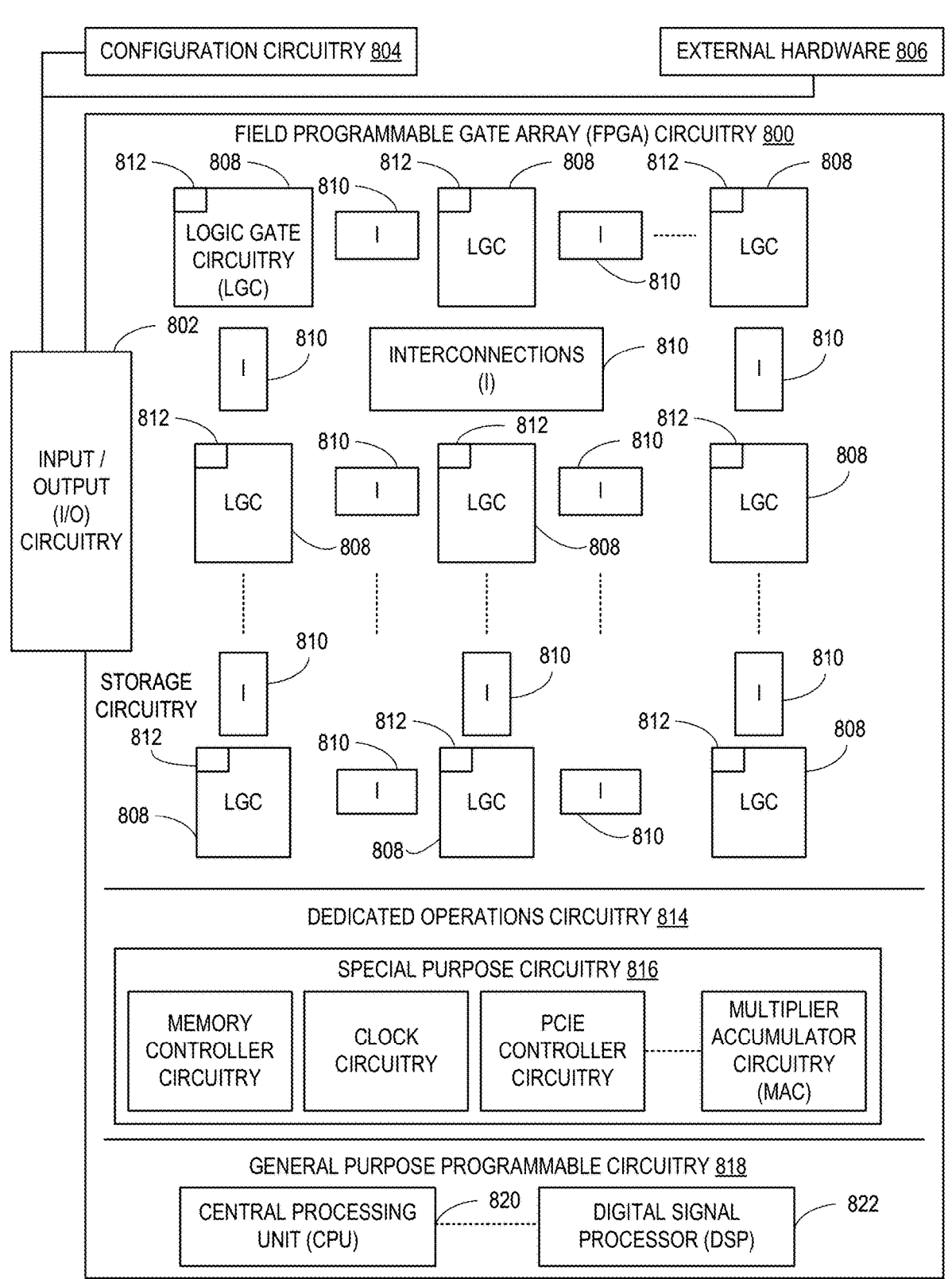
FIG. 8 is a block diagram of another example implementation of the programmable circuitry of FIG. 6.

FIG. 8 is a block diagram of another example implementation of the programmable circuitry 612 of FIG. 6. In this example, the programmable circuitry 612 is implemented by FPGA circuitry 800. For example, the FPGA circuitry 800 may be implemented by an FPGA. The FPGA circuitry 800 can be used, for example, to perform operations that could otherwise be performed by the example microprocessor 700 of FIG. 7 executing corresponding machine readable instructions. However, once configured, the FPGA circuitry 800 instantiates the operations and/or functions corresponding to the machine readable instructions in hardware and, thus, can often execute the operations/functions faster than they could be performed by a general-purpose microprocessor executing the corresponding software.

More specifically, in contrast to the microprocessor 700 of FIG. 7 described above (which is a general purpose device that may be programmed to execute some or all of the machine readable instructions represented by the flowchart(s) of FIG. 2 but whose interconnections and logic circuitry are fixed once fabricated), the FPGA circuitry 800 of the example of FIG. 8 includes interconnections and logic circuitry that may be configured, structured, programmed, and/or interconnected in different ways after fabrication to instantiate, for example, some or all of the operations/functions corresponding to the machine readable instructions represented by the flowchart(s) of FIG. 2. In particular, the FPGA circuitry 800 may be thought of as an array of logic gates, interconnections, and switches. The switches can be programmed to change how the logic gates are interconnected by the interconnections, effectively forming one or more dedicated logic circuits (unless and until the FPGA circuitry 800 is reprogrammed). The configured logic circuits enable the logic gates to cooperate in different ways to perform different operations on data received by input circuitry. Those operations may correspond to some or all of the instructions (e.g., the software and/or firmware) represented by the flowchart(s) of FIG. 2. As such, the FPGA circuitry 800 may be configured and/or structured to effectively instantiate some or all of the operations/functions corresponding to the machine readable instructions of the flowchart(s) of FIG. 2 as dedicated logic circuits to perform the operations/functions corresponding to those software instructions in a dedicated manner analogous to an ASIC. Therefore, the FPGA circuitry 800 may perform the operations/functions corresponding to the some or all of the machine readable instructions of FIG. 2 faster than the general-purpose microprocessor can execute the same.

In the example of FIG. 8, the FPGA circuitry 800 is configured and/or structured in response to being programmed (and/or reprogrammed one or more times) based on a binary file. In some examples, the binary file may be compiled and/or generated based on instructions in a hardware description language (HDL) such as Lucid, Very High Speed Integrated Circuits (VHSIC) Hardware Description Language (VHDL), or Verilog. For example, a user (e.g., a human user, a machine user, etc.) may write code or a program corresponding to one or more operations/functions in an HDL; the code/program may be translated into a low-level language as needed; and the code/program (e.g., the code/program in the low-level language) may be converted (e.g., by a compiler, a software application, etc.) into the binary file. In some examples, the FPGA circuitry 800 of FIG. 8 may access and/or load the binary file to cause the FPGA circuitry 800 of FIG. 8 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 800 of FIG. 8 to cause configuration and/or structuring of the FPGA circuitry 800 of FIG. 8, or portion(s) thereof.

In some examples, the binary file is compiled, generated, transformed, and/or otherwise output from a uniform software platform utilized to program FPGAs. For example, the uniform software platform may translate first instructions (e.g., code or a program) that correspond to one or more operations/functions in a high-level language (e.g., C, C++, Python, etc.) into second instructions that correspond to the one or more operations/functions in an HDL. In some such examples, the binary file is compiled, generated, and/or otherwise output from the uniform software platform based on the second instructions. In some examples, the FPGA circuitry 800 of FIG. 8 may access and/or load the binary file to cause the FPGA circuitry 800 of FIG. 8 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 800 of FIG. 8 to cause configuration and/or structuring of the FPGA circuitry 800 of FIG. 8, or portion(s) thereof.

The FPGA circuitry 800 of FIG. 8, includes example input/output (I/O) circuitry 802 to obtain and/or output data to/from example configuration circuitry 804 and/or external hardware 806. For example, the configuration circuitry 804 may be implemented by interface circuitry that may obtain a binary file, which may be implemented by a bit stream, data, and/or machine-readable instructions, to configure the FPGA circuitry 800, or portion(s) thereof. In some such examples, the configuration circuitry 804 may obtain the binary file from a user, a machine (e.g., hardware circuitry (e.g., programmable or dedicated circuitry) that may implement an Artificial Intelligence/Machine Learning (AI/ML) model to generate the binary file), etc., and/or any combination(s) thereof. In some examples, the external hardware 806 may be implemented by external hardware circuitry. For example, the external hardware 806 may be implemented by the microprocessor 700 of FIG. 7.

The FPGA circuitry 800 also includes an array of example logic gate circuitry 808, a plurality of example configurable interconnections 810, and example storage circuitry 812. The logic gate circuitry 808 and the configurable interconnections 810 are configurable to instantiate one or more operations/functions that may correspond to at least some of the machine readable instructions of FIG. 2 and/or other desired operations. The logic gate circuitry 808 shown in FIG. 8 is fabricated in blocks or groups. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 808 to enable configuration of the electrical structures and/or the logic gates to form circuits to perform desired operations/functions. The logic gate circuitry 808 may include other electrical structures such as look-up tables (LUTs), registers (e.g., flip-flops or latches), multiplexers, etc.

The configurable interconnections 810 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 808 to program desired logic circuits.

The storage circuitry 812 of the illustrated example is structured to store result(s) of the one or more of the operations performed by corresponding logic gates. The storage circuitry 812 may be implemented by registers or the like. In the illustrated example, the storage circuitry 812 is distributed amongst the logic gate circuitry 808 to facilitate access and increase execution speed.

The example FPGA circuitry 800 of FIG. 8 also includes example dedicated operations circuitry 814. In this example, the dedicated operations circuitry 814 includes special purpose circuitry 816 that may be invoked to implement commonly used functions to avoid the need to program those functions in the field. Examples of such special purpose circuitry 816 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 800 may also include example general purpose programmable circuitry 818 such as an example CPU 820 and/or an example DSP 822. Other general purpose programmable circuitry 818 may additionally or alternatively be present such as a GPU, an XPU, etc., that can be programmed to perform other operations.

Although FIGS. 7 and 8 illustrate two example implementations of the programmable circuitry 612 of FIG. 6, many other approaches are contemplated. For example, FPGA circuitry may include an on-board CPU, such as one or more of the example CPU 820 of FIG. 7. Therefore, the programmable circuitry 612 of FIG. 6 may additionally be implemented by combining at least the example microprocessor 700 of FIG. 7 and the example FPGA circuitry 800 of FIG. 8. In some such hybrid examples, one or more cores 702 of FIG. 7 may execute a first portion of the machine readable instructions represented by the flowchart(s) of FIG. 2 to perform first operation(s)/function(s), the FPGA circuitry 800 of FIG. 8 may be configured and/or structured to perform second operation(s)/function(s) corresponding to a second portion of the machine readable instructions represented by the flowchart of FIG. 2, and/or an ASIC may be configured and/or structured to perform third operation(s)/function(s) corresponding to a third portion of the machine readable instructions represented by the flowchart of FIG. 2.

It should be understood that some or all of the circuitry of FIG. 1 may, thus, be instantiated at the same or different times. For example, same and/or different portion(s) of the microprocessor 700 of FIG. 7 may be programmed to execute portion(s) of machine-readable instructions at the same and/or different times. In some examples, same and/or different portion(s) of the FPGA circuitry 800 of FIG. 8 may be configured and/or structured to perform operations/functions corresponding to portion(s) of machine-readable instructions at the same and/or different times.

In some examples, some or all of the circuitry of FIG. 1 may be instantiated, for example, in one or more threads executing concurrently and/or in series. For example, the microprocessor 700 of FIG. 7 may execute machine readable instructions in one or more threads executing concurrently and/or in series. In some examples, the FPGA circuitry 800 of FIG. 8 may be configured and/or structured to carry out operations/functions concurrently and/or in series. Moreover, in some examples, some or all of the circuitry of FIG. 1 may be implemented within one or more virtual machines and/or containers executing on the microprocessor 700 of FIG. 7.

In some examples, the programmable circuitry 612 of FIG. 6 may be in one or more packages. For example, the microprocessor 700 of FIG. 7 and/or the FPGA circuitry 800 of FIG. 8 may be in one or more packages. In some examples, an XPU may be implemented by the programmable circuitry 612 of FIG. 6, which may be in one or more packages. For example, the XPU may include a CPU (e.g., the microprocessor 700 of FIG. 7, the CPU 820 of FIG. 8, etc.) in one package, a DSP (e.g., the DSP 822 of FIG. 8) in another package, a GPU in yet another package, and an FPGA (e.g., the FPGA circuitry 800 of FIG. 8) in still yet another package.

Figure 9:
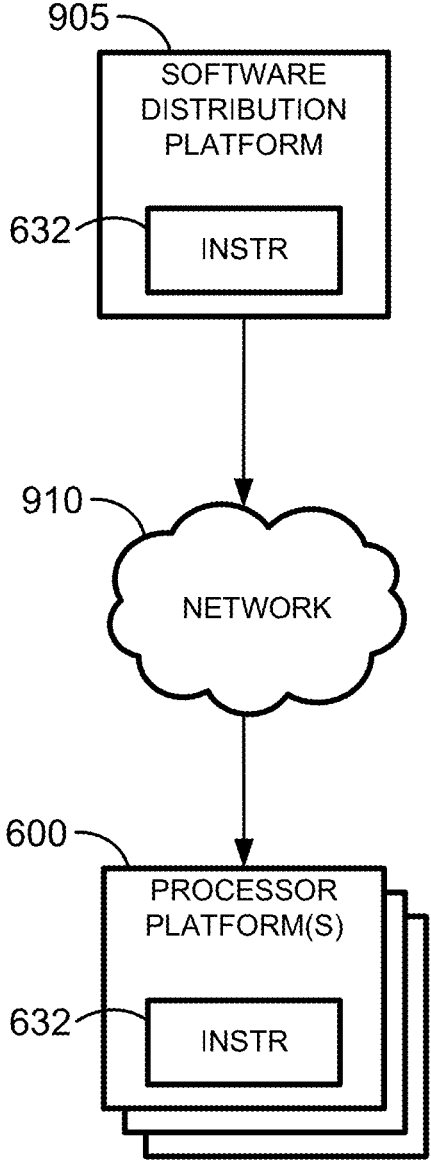
FIG. 9 is a block diagram of an example software/firmware/instructions distribution platform (e.g., one or more servers) to distribute software, instructions, and/or firmware (e.g., corresponding to the example machine readable instructions of FIGS. 2A and/or 2B) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 905 to distribute software such as the example machine readable instructions 632 of FIG. 6 to other hardware devices (e.g., hardware devices owned and/or operated by third parties from the owner and/or operator of the software distribution platform) is illustrated in FIG. 9. The example software distribution platform 905 may be implemented by any computer server, data facility, cloud service, etc., capable of storing and transmitting software to other computing devices. The third parties may be customers of the entity owning and/or operating the software distribution platform 905. For example, the entity that owns and/or operates the software distribution platform 905 may be a developer, a seller, and/or a licensor of software such as the example machine readable instructions 632 of FIG. 6. The third parties may be consumers, users, retailers, OEMs, etc., who purchase and/or license the software for use and/or re-sale and/or sub-licensing. In the illustrated example, the software distribution platform 905 includes one or more servers and one or more storage devices. The storage devices store the machine readable instructions 632, which may correspond to the example machine readable instructions of FIG. 2, as described above. The one or more servers of the example software distribution platform 905 are in communication with an example network 910, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 632 from the software distribution platform 905. For example, the software, which may correspond to the example machine readable instructions of FIG. 2, may be downloaded to the example programmable circuitry platform 600, which is to execute the machine readable instructions 632 to implement the guardrail platform 110. In some examples, one or more servers of the software distribution platform 905 periodically offer, transmit, and/or force updates to the software (e.g., the example machine readable instructions 632 of FIG. 6) to ensure improvements, patches, updates, etc., are distributed and applied to the software at the end user devices. Although referred to as software above, the distributed "software" could alternatively be firmware.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified herein.

As used herein "substantially real time" refers to occurrence in a near instantaneous manner recognizing there may be real world delays for computing time, transmission, etc. Thus, unless otherwise specified, "substantially real time" refers to real time+1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "programmable circuitry" is defined to include (i) one or more special purpose electrical circuits (e.g., an application specific circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations and/or functions, Field Programmable Gate Arrays (FPGAs) that may be programmed with second instructions to cause configuration and/or structuring of the FPGAs to instantiate one or more operations and/or functions corresponding to the first instructions, Graphics Processor Units (GPUs) that may execute first instructions to perform one or more operations and/or functions, Digital Signal Processors (DSPs) that may execute first instructions to perform one or more operations and/or functions, XPUs, Network Processing Units (NPUs) one or more microcontrollers that may execute first instructions to perform one or more operations and/or functions and/or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and/or any combination(s) thereof), and orchestration technology (e.g., application programming interface(s) (API(s)) that may assign computing task(s) to whichever one(s) of the multiple types of programmable circuitry is/are suited and available to perform the computing task(s).

As used herein integrated circuit/circuitry is defined as one or more semiconductor packages containing one or more circuit elements such as transistors, capacitors, inductors, resistors, current paths, diodes, etc. For example an integrated circuit may be implemented as one or more of an ASIC, an FPGA, a chip, a microchip, programmable circuitry, a semiconductor substrate coupling multiple circuit elements, a system on chip (SoC), etc.

From the foregoing, it will be appreciated that example systems, apparatus, articles of manufacture, and methods have been disclosed that enable large language models to be utilized in various contexts while providing guardrails for the responses that are provided the LLM. Disclosed systems, apparatus, articles of manufacture, and methods improve the efficiency of using a computing device by limiting the amount of additional anti-hypothesis that are added to a prompt for generation of a response. Limiting the amount of anti-hypothesis results in smaller prompts being transmitted to and/or operated upon by an LLM, thereby reducing the processing requirements of a platform operating the LLM. Disclosed systems, apparatus, articles of manufacture, and methods are accordingly directed to one or more improvement(s) in the operation of a machine such as a computer or other electronic and/or mechanical device.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. An apparatus comprising:
interface circuitry;
instructions; and
programmable circuitry to at least one of execute or instantiate the instructions to:
access a first response message provided by a first large language model, the first response message generated based on an initial prompt;
cause a second large language model to determine the first response message is inappropriate based on evaluation of the first response message with respect to a generalized hypothesis applicable to a plurality of appropriateness tests;
after the determination that the first response message is inappropriate with respect to the generalized hypothesis, cause the second large language model to determine the first response message is inappropriate based on evaluation of the first response message with respect to a specialized hypothesis from among a plurality of specialized hypotheses corresponding to the generalized hypothesis;
after the determination that the first response message is inappropriate with respect to the specialized hypothesis, modify the initial prompt to create a modified prompt by insertion of an anti-hypothesis corresponding to the specialized hypothesis; and
provide the modified prompt to the first large language model to trigger generation of a second response message.

2. The apparatus of claim 1, wherein after the determination that the second response message is appropriate, the programmable circuitry is to cause the second response message to be output to a requestor.

3. The apparatus of claim 1, wherein, after the determination that the first response message is inappropriate with respect to the generalized hypothesis, the programmable circuitry is to cause the second large language model to evaluate the first response message with respect to two or more specialized hypotheses from among the plurality of specialized hypotheses.

4. The apparatus of claim 3, wherein the programmable circuitry is to select the specialized hypothesis based on comparative indications of inappropriateness produced by the evaluations of the two or more specialized hypotheses.

5. The apparatus of claim 1, wherein the anti-hypothesis corresponds to one or more specialized hypotheses for which the first response message is determined to be inappropriate.

6. The apparatus of claim 5, wherein the modification of the initial prompt includes insertion of a plurality of anti-hypotheses corresponding to a plurality of specialized hypotheses that indicate the first response message is inappropriate.

7. At least one non-transitory computer-readable storage medium comprising instructions that cause one or more of at least one processor circuitry to at least:

access a first response message provided by a first large language model, the first response message generated based on an initial prompt;

cause a second large language model to determine the first response message is inappropriate based on evaluation of the first response message with respect to a generalized hypothesis applicable to a plurality of appropriateness tests;

after the determination that the first response message is inappropriate with respect to the generalized hypothesis, cause the second large language model to determine the first response message is inappropriate based on evaluation of the first response message with respect to a specialized hypothesis from among a plurality of specialized hypotheses corresponding to the generalized hypothesis;

after the determination that the first response message is inappropriate with respect to the specialized hypothesis, modify the initial prompt to create a modified prompt by insertion of an anti-hypothesis corresponding to the specialized hypothesis; and provide the modified prompt to the first large language model to trigger generation of a second response message.

8. The at least one non-transitory computer-readable storage medium of claim 7, wherein the second response message is appropriate, the instructions cause the one or more of the at least one processor circuitry to cause the second response message to be output to a requestor.

9. The at least one non-transitory computer-readable storage medium of claim 7, wherein, after the determination that the first response message is inappropriate with respect to the generalized hypothesis, one or more of the at least one processor circuitry is to cause the second large language model to evaluate the first response message with respect to two or more specialized hypotheses from among the plurality of specialized hypotheses.

10. The at least one non-transitory computer-readable storage medium of claim 9, wherein one or more of the at least one processor circuitry is to select the specialized hypothesis based on comparative indications of inappropriateness produced by the evaluations of the two or more specialized hypotheses.

11. The at least one non-transitory computer-readable storage medium of claim 7, wherein the anti-hypothesis corresponds to one or more specialized hypotheses for which the first response message is determined to be inappropriate.

12. The at least one non-transitory computer-readable storage medium of claim 11, wherein the modification of the initial prompt includes insertion of a plurality of anti-hypotheses corresponding to a plurality of specialized hypotheses that indicate the first response message is inappropriate.

13. A method for analyzing a response of a large language model, the method comprising:

accessing a first response message provided by a first large language model, the first response message generated based on an initial prompt;

causing a second large language model to determine the first response message is inappropriate based on evaluation of the first response message with respect to a generalized hypothesis applicable to a plurality of appropriateness tests;

after the determination that the first response message is inappropriate with respect to the generalized hypothesis, causing the second large language model to determine the first response message is inappropriate based on evaluation of the first response message with respect to a specialized hypothesis from among a plurality of specialized hypotheses corresponding to the generalized hypothesis;

after the determination that the first response message is inappropriate with respect to the specialized hypothesis, modifying the initial prompt to create a modified prompt by insertion of an anti-hypothesis corresponding to the specialized hypothesis; and providing the modified prompt to the first large language model to trigger generation of a second response message.

14. The method of claim 13, wherein the second response message is appropriate, and further including causing the second response message to be output to a requestor.

15. The method of claim 13, including, after the determination that the first response message is inappropriate with respect to the generalized hypothesis, causing the second large language model to evaluate the first response message with respect to two or more specialized hypotheses from among the plurality of specialized hypotheses.

16. The method of claim 15, including selecting the specialized hypothesis based on comparative indications of inappropriateness produced by the evaluations of the two or more specialized hypotheses.

17. The method of claim 13, wherein the anti-hypothesis corresponds to one or more specialized hypotheses for which the first response message is determined to be inappropriate.

18. The method of claim 17, wherein the modification of the initial prompt includes insertion of a plurality of anti-hypotheses corresponding to a plurality of specialized hypotheses that indicate the first response message is inappropriate.

* * * * *